Feb. 11, 1958     C. R. NICOLIN     2,822,665
IMPROVEMENTS IN A DEVICE FOR STARTING GAS TURBINE PLANTS
Filed Jan. 28, 1955
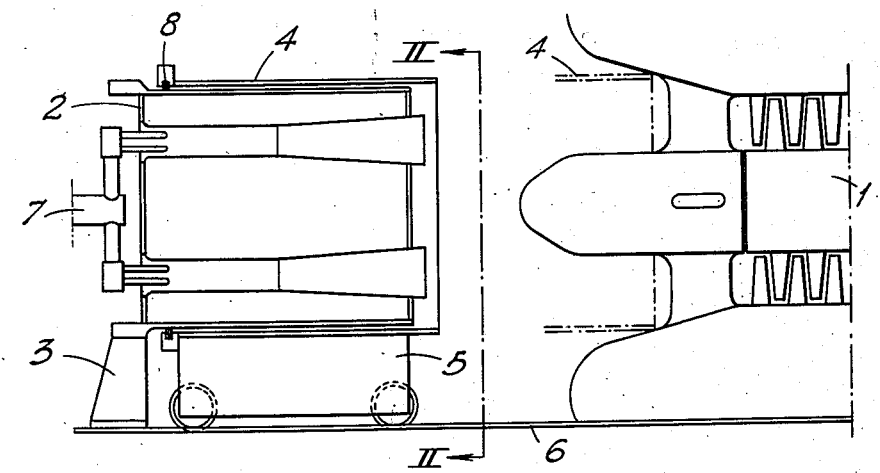
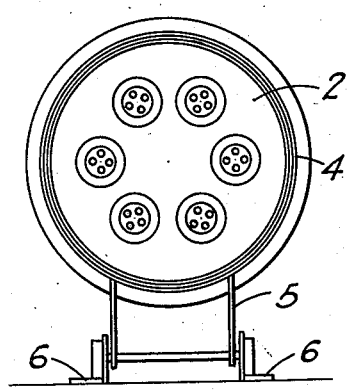
Inventor
Curt Rene Nicolin
by Sommers + Young
Attorneys United States Patent Office 2,822,665
Patented Feb. 11, 1958

2,822,665

IMPROVEMENTS IN A DEVICE FOR STARTING GAS TURBINE PLANTS

Curt René Nicolin, Finspong, Sweden

Application January 28, 1955, Serial No. 484,790

3 Claims. (Cl. 60—39.14)

The present invention relates to gas turbines which are started by supplying compressed air from a starting compressor to the compressor of the gas turbine.

The object of the invention is to provide means for effecting a transient communication, free from leakage, between the two compressors during the starting period.

The invention is characterized, chiefly, by the fact that the starting compressor is rigidly arranged in front of the compressor of the gas turbine at such a distance therefrom as not to interfere with the entrance of air to the gas turbine after the starting is ended, and provided with an axially displaceable cover surrounding the starting compressor which for effecting the starting operation is displaced towards the compressor of the gas turbine so as to form a closed air passage between the two compressors and which, after the gas turbine has started, is restored to its initial position covering the starting compressor.

The invention is illustrated in the accompanying drawings, in which Fig. 1 is an axial section of a starting compressor and a portion of the compressor of the gas turbine. Fig. 2 is a cross section on the line II—II of Fig. 1.

With reference to the drawing, the numeral 1 designates the compressor of a stationary gas turbine. Provided in front of the compressor 1 is a starting compressor 2 comprising in the example shown a jet compressor rigidly arranged with relation to the compressor 1 on a foundation 3 at such a distance from compressor 1 as not to interfere with the entrance of air thereto after the starting period is ended. The compressor 2 is provided with a surrounding cover 4 supported by a carriage 5 the wheels of which run on rails 6 so as to allow the cover to be moved towards and away from the air intake of the compressor 1.

When the gas turbine is to be started the cover 4 is displaced by means of a control device, not shown, by the action of compressed air, towards the compressor 1 into the position indicated by dotted lines. Air under pressure is admitted through a conduit 7 to the jet compressor 2 which delivers highly compressed air to the compressor 1 causing it to start rotating. When the gas turbine has attained such a speed as to be capable of driving itself the cover 4 is retracted, by means not shown, to its initial position covering the jet compressor, thereby allowing air to be sucked into the compressor 1 through the space between the two compressors.

At its end remote from the gas turbine the cover 4 is provided with a packing 8 for sealing the space between the cover and the jet compressor so as to prevent leakage of air by this passage during the starting period.

It is to be noted that instead of a jet compressor a motor driven compressor may be used.

I claim:

1. In a power plant, in combination, a gas turbine having a compressor and an air intake therefor, a separate compressor arranged in front of said air intake in spaced relation thereto for delivering compressed air thereto for starting purposes, a surrounding cover slidably mounted on said starting compressor, a carriage for supporting and moving said cover towards and away from the air intake of the gas turbine, said cover being adapted to be displaced into engagement with said air intake so as to form a closed air passage between the starting compressor and the gas turbine compressor during the starting period and to be retracted therefrom at the end of said period for allowing atmospheric air to be directly sucked in through the air intake by the action of the compressor of the gas turbine.

2. In a power plant, in combination, a gas turbine having a compressor and an air intake therefor, a separate compressor stationarily arranged with relation to the gas turbine in spaced relation to the air intake thereof for delivering compressed air to the compressor of the gas turbine for starting same, a cover slidably surrounding the starting compressor, a carriage for supporting and moving said cover towards and into engagement with said air intake for causing said cover to form a closed air channel between the starting compressor and the gas turbine compressor for starting purposes, and for retracting the cover from said engagement at the end of the starting period for allowing atmospheric air to freely enter the air intake of the gas turbine via the space between the starting compressor and said air intake.

3. In a power plant, in combination, a gas turbine having a compressor and an air intake therefor, a separate compressor stationarily arranged with relation to the gas turbine in spaced relation to the air intake thereof for delivering compressed air to the compressor of the gas turbine for starting same, a cover slidably surrounding the starting compressor, a sealed connection between the end of said cover remote from the gas turbine and the starting compressor, a carriage for supporting and moving said cover towards and into engagement with said air intake for causing said cover to form a closed air channel between the starting compressor and the gas turbine compressor for starting purposes, and for retracting the cover from said engagement at the end of the starting period for allowing atmospheric air to freely enter the air intake of the gas turbine via the space between the starting compressor and said air intake.

References Cited in the file of this patent

UNITED STATES PATENTS

| | | |
|---|---|---|
| 1,854,615 | Lasley | Apr. 19, 1932 |
| 2,365,551 | Hermitte | Dec. 19, 1944 |